United States Patent
Nimrichter et al.

(10) Patent No.: US 10,940,755 B2
(45) Date of Patent: Mar. 9, 2021

(54) DIESEL EXHAUST FLUID TANK VENTING SYSTEM

(71) Applicant: Stant USA Corp., Connersville, IN (US)

(72) Inventors: Jan Nimrichter, Karvina (CZ); Nuno Bras, Ostrava (CZ)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 16/567,222

(22) Filed: Sep. 11, 2019

(65) Prior Publication Data

US 2020/0156464 A1    May 21, 2020

Related U.S. Application Data

(60) Provisional application No. 62/767,783, filed on Nov. 15, 2018.

(51) Int. Cl.
| | | |
|---|---|---|
| *F01N 3/00* | (2006.01) | |
| *B60K 15/035* | (2006.01) | |
| *B60K 13/04* | (2006.01) | |
| *F01N 3/20* | (2006.01) | |

(52) U.S. Cl.
CPC ............ *B60K 15/035* (2013.01); *B60K 13/04* (2013.01); *F01N 3/208* (2013.01); *F01N 2610/1406* (2013.01); *F01N 2610/1413* (2013.01)

(58) Field of Classification Search
CPC ........ B60K 15/035; B60K 13/04; F01N 3/208
USPC ........................................................ 60/282
See application file for complete search history.

(56) References Cited

U.S. PATENT DOCUMENTS

| | | | | |
|---|---|---|---|---|
| 5,404,906 | A * | 4/1995 | Aoshima | B60K 15/03504 123/519 |
| 6,276,387 | B1 * | 8/2001 | Pachciarz | B60K 15/035 123/516 |
| 8,910,620 | B2 | 12/2014 | Kraus | |
| 8,967,181 | B2 * | 3/2015 | Wetzel | F01N 3/208 137/202 |
| 9,701,193 | B2 * | 7/2017 | Heidemeyer | B60K 15/035 |
| 2006/0011257 | A1 | 1/2006 | Devall | |
| 2006/0070656 | A1 | 4/2006 | Crawford | |
| 2009/0250122 | A1 * | 10/2009 | Menke | F02M 25/089 137/511 |
| 2012/0118159 | A1 * | 5/2012 | Kitamura | F02M 37/0047 96/152 |
| 2012/0186677 | A1 | 7/2012 | Wetzel et al. | |
| 2016/0290520 | A1 | 10/2016 | Memmer et al. | |
| 2017/0184000 | A1 * | 6/2017 | Koukan | B60K 13/04 |

(Continued)

FOREIGN PATENT DOCUMENTS

| | | | |
|---|---|---|---|
| CN | 202789032 U | 3/2013 | |
| DE | 4343498 A1 * | 6/1994 | ............ B60K 15/04 |
| KR | 10-1510339 B1 | 4/2015 | |

OTHER PUBLICATIONS

PCT Search Report and Written Opinion completed by the ISA/KR on Feb. 27, 2020 and issued in connection with PCT/US2019/059132.

*Primary Examiner* — Jason D Shanske
(74) *Attorney, Agent, or Firm* — Barnes & Thornburg LLP

(57) ABSTRACT

An exhaust after-treatment system associated with a diesel engine includes a diesel exhaust fluid storage unit. The storage unit includes a diesel exhaust fluid tank and a vent system coupled to the tank and configured to regulate flow of air into the tank and fluid vapor out of the tank.

15 Claims, 6 Drawing Sheets

(56) References Cited

U.S. PATENT DOCUMENTS

| | | | |
|---|---|---|---|
| 2017/0304763 A1* | 10/2017 | Nelson | F01N 3/2066 |
| 2018/0043766 A1* | 2/2018 | Wada | B60K 15/035 |
| 2018/0299027 A1* | 10/2018 | Fulford | F16K 31/22 |
| 2020/0157991 A1* | 5/2020 | Nimrichter | F01N 3/2066 |

* cited by examiner

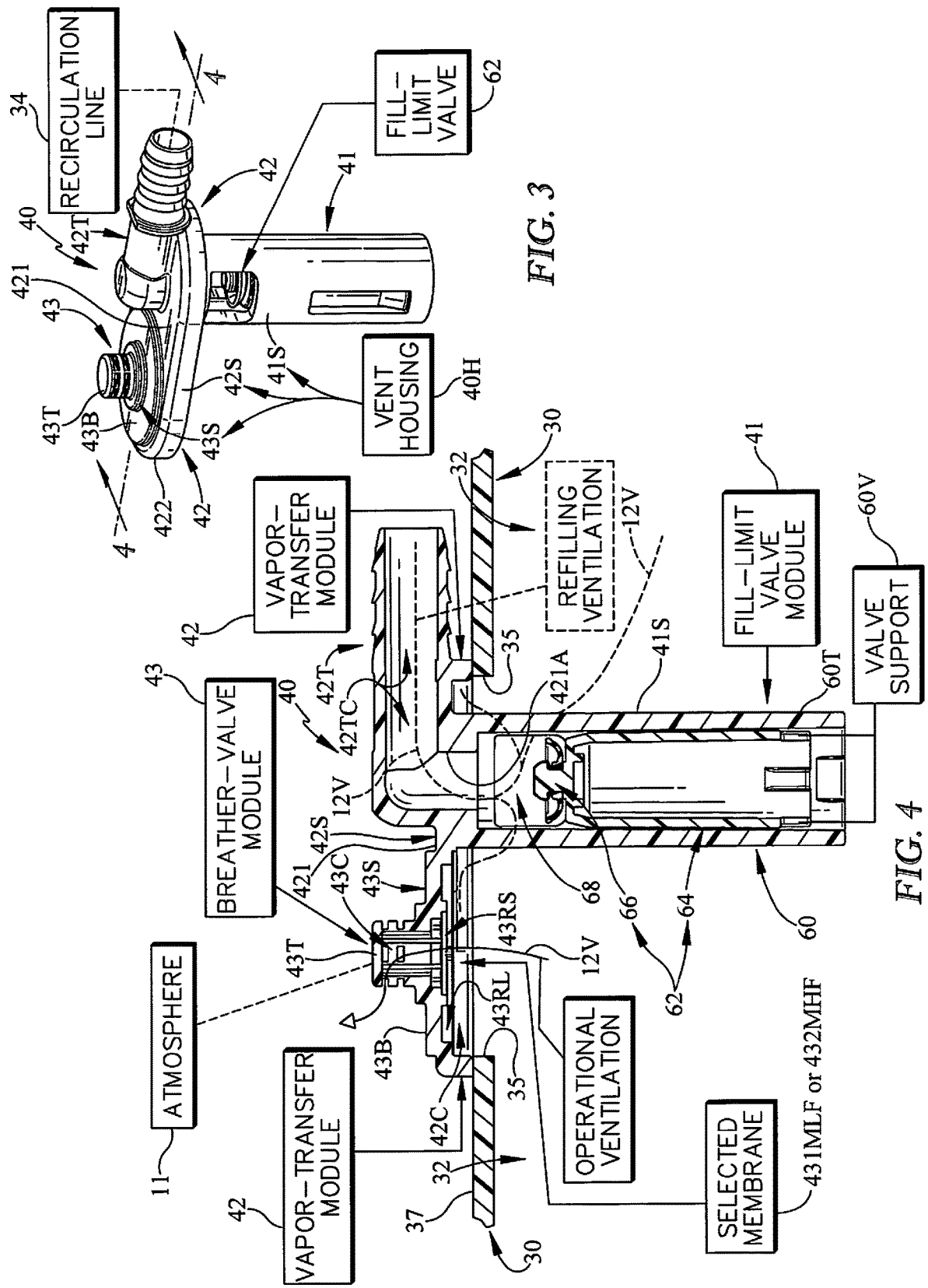

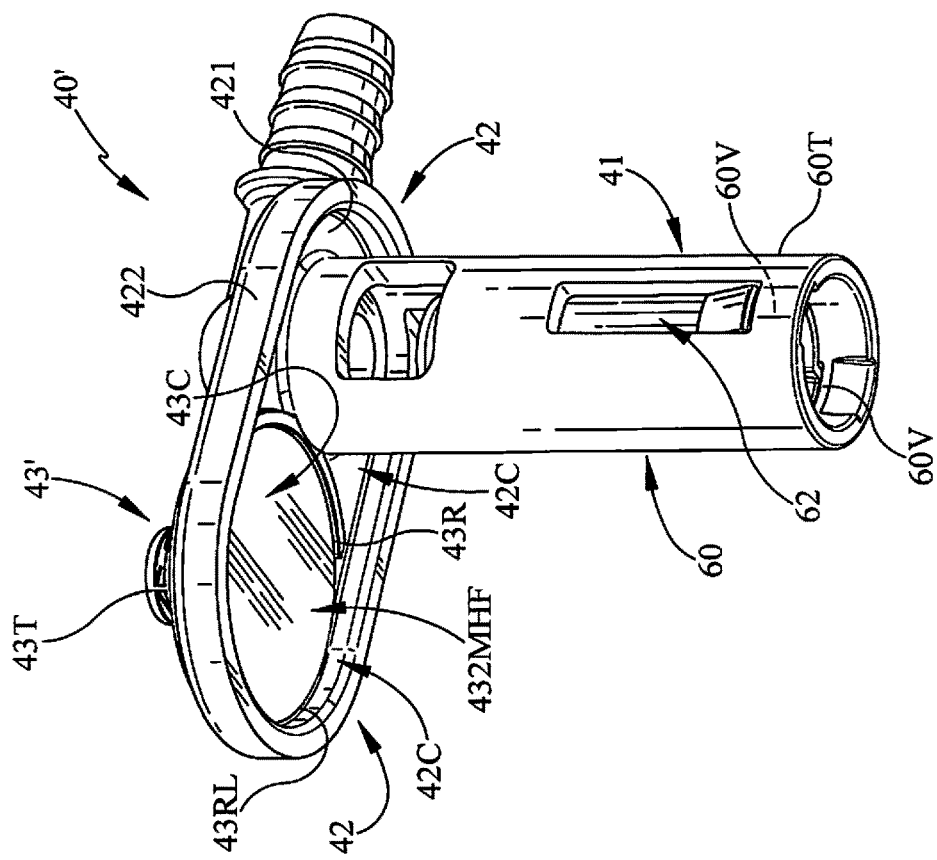
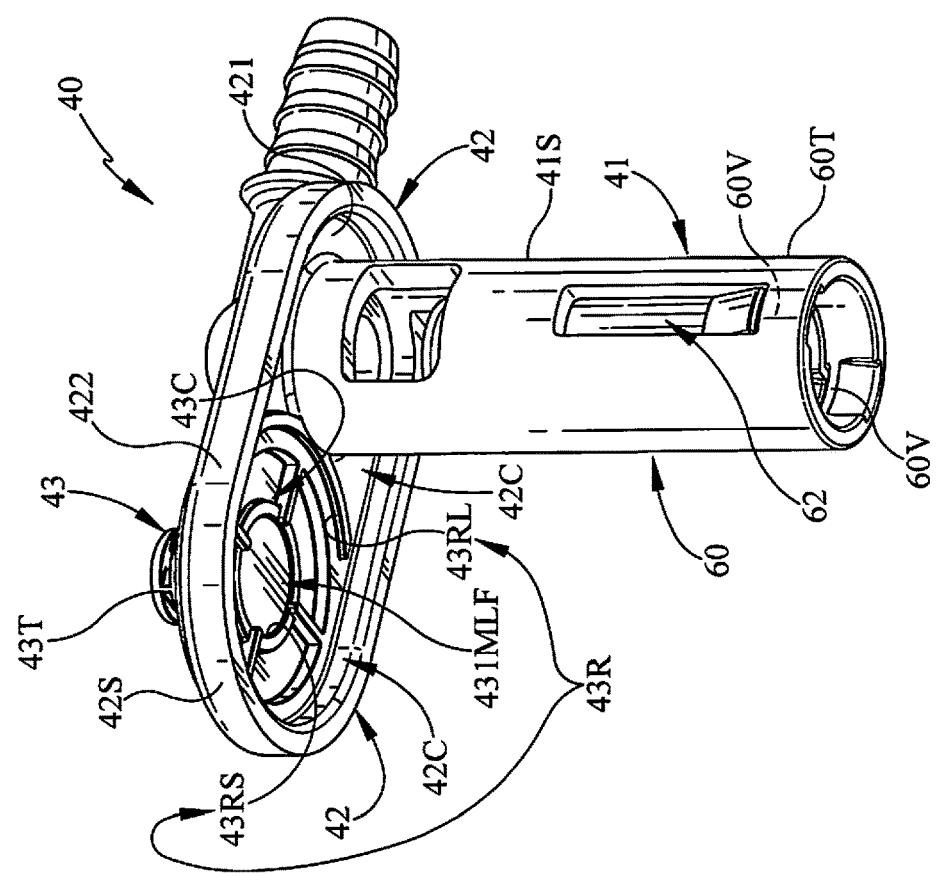

US 10,940,755 B2

DIESEL EXHAUST FLUID TANK VENTING SYSTEM

PRIORITY CLAIM

This application claims priority under 35 U.S.C. § 119(e) to U.S. Provisional Application No. 62/767,783, filed Nov. 15, 2018, which is expressly incorporated by reference herein.

BACKGROUND

The present disclosure relates to systems for controlling venting of fluid vapors from a diesel exhaust fluid tank, and particularly to a multiple valve tank venting system. More particularly, the present disclosure relates to a tank-mounted tank venting control valve.

SUMMARY

An exhaust after-treatment system associated with a diesel engine and an engine exhaust pipe includes a diesel exhaust fluid storage unit. In illustrative embodiments, the storage unit includes a diesel exhaust fluid DEF tank and a vent system coupled to the DEF tank and configured to regulate flow of air into the DEF tank and fluid vapor out of the DEF tank.

In illustrative embodiments, the vent system includes a diesel exhaust fluid tank venting control unit arranged to extend into an interior region of the diesel exhaust fluid (DEF) tank through a single unit-mount aperture formed in the top wall of the DEF tank. The tank venting control unit includes a fill-limit valve module located, for example, in the DEF tank and exposed to fluid vapor extant in the DEF tank, a breather-valve module located outside the tank and exposed to the atmosphere, and a vapor-transfer module in fluid communication with each of the fill-limit valve and breather-valve modules. The vapor-transfer module is adapted to transfer fluid vapor discharged from an interior region of the DEF tank through the fill-limit valve module to a DEF vapor recirculation line associated with a tank filler neck coupled to the DEF tank.

In illustrative embodiments, each of the breather-valve, vapor-transfer, and fill-limit valve modules includes a hollow shell made of a plastics material. The three hollow shells cooperate to form a unitary vent housing that is associated with the single unit-mount aperture formed in the top wall of the DEF tank. The shell of the breather-valve module cooperates with either a low-flow membrane or a relatively high-flow membrane to form the breather-valve module. The shell of the fill-limit valve module cooperates with a fill-limit valve to form the fill-limit valve module. And the shell of the vapor-transfer module is interposed between and coupled to each of the shells of the breather-valve and fill-limit valve modules to cause the vapor-transfer module to be interposed between and coupled in fluid communication to each of the breather-valve and fill-limit valve modules.

In illustrative embodiments, the breather-valve module includes a membrane receiver and the vent system further includes first and second semi-permeable membranes that cooperate with the shell of the breather-valve module and other components of the tank venting control unit to provide a venting kit. The membrane receiver is formed in the shell that is included in the breathing-valve module and is configured to receive either the first semi-permeable membrane to establish a first embodiment of the breather-valve module or the second semi-permeable membrane to establish a second embodiment of the breather-valve module. The membrane receiver opens downwardly to communicate with an interior chamber that is formed in the shell of the vapor-transfer module and exposed to diesel exhaust fluid vapor in the DEF tank.

In illustrative embodiments, the membrane receiver of the breather-valve module includes a small cavity sized to receive a small membrane and a concentric relatively larger cavity sized to receive a relatively larger membrane. In one vent system configuration, the small membrane is mounted in the small cavity to limit the flow of tank vapor therethrough during tank ventilation of the atmosphere to a relatively low flow rate. In another vent system configuration, the relatively larger membrane is mounted in the relatively larger cavity to provide high-flow ventilation and to allow the flow of tank vapor there through to the atmosphere during tank ventilation at a relatively higher flow rate.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is an enlarged perspective view of the illustrative DEF tank venting control unit of FIG. 2 and showing that the DEF tank venting control unit includes a unitary vent housing comprising a fill-limit valve for opening and closing the DEF vapor recirculation line depending of the volume of liquid DEF in the tank;

FIG. 4 is an enlarged sectional view of the DEF tank venting control unit taken along line 4-4 of FIG. 3 after it has been mounted on the top wall of the DEF tank to cause the fill-limit valve module to extend through a single unit-mount aperture formed in the top wall into the interior region of the DEF tank and showing that the DEF tank venting control unit further includes a breather-valve module that is exposed to the atmosphere and a vapor-transfer module interposed between and coupled in fluid communication to each of the fill-limit valve module and the breather-valve module and showing that the fill-limit valve comprises a float supported on a valve support and mounted for up-and-down movement in a float chamber formed in a tubular body provided by the shell of the fill-limit valve module in response to rising and falling levels of diesel exhaust fluid in the DEF tank and showing (in solid) an exemplary operational venting process in which DEF vapor is vented from an interior region of the DEF tank through the breather-valve module to the atmosphere and suggesting (in phantom) flow of DEF vapor from the interior region of the DEF tank and the interior chamber of the vapor-transfer module through the fill-limit valve module and a vapor-conducting channel in a vapor-discharge tube of the vapor-transfer module to the DEF vapor recirculation line during an exemplary refilling ventilation process;

FIG. 6A is a perspective view of a first embodiment of a DEF tank venting control unit comprising a low-flow membrane mounted in a small-diameter first membrane-receiving cavity; and FIG. 6B is a perspective view of a second embodiment of a DEF tank venting control unit comprising a high-flow membrane mounted in a large-diameter second membrane-receiving cavity that is concentric with the small-diameter first membrane-receiving cavity as suggested in FIG. 5.

DETAILED DESCRIPTION

Figure 1:
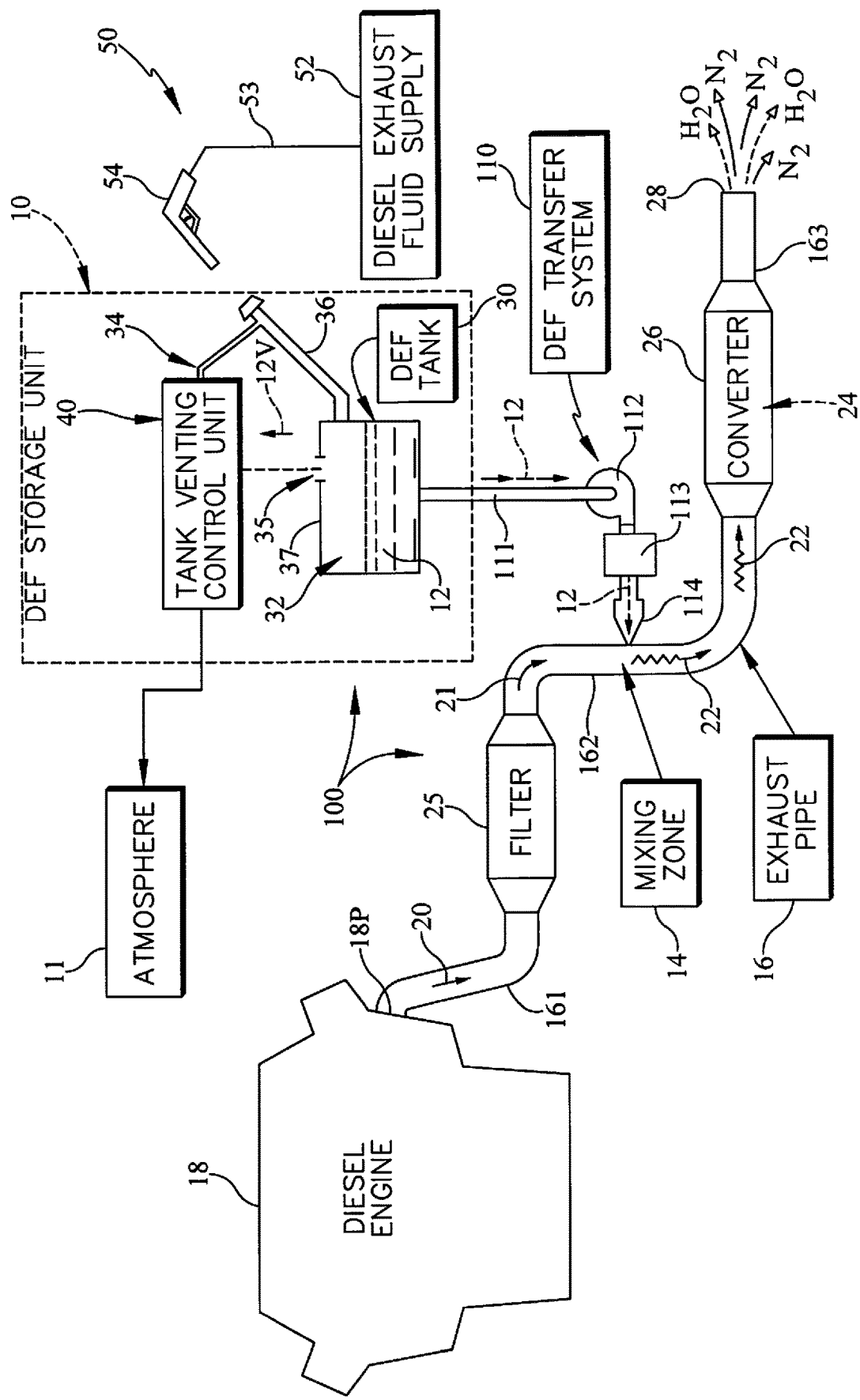
FIG. 1 is a diagrammatic view of an illustrative exhaust after-treatment system associated with a diesel engine and comprising a diesel exhaust fluid (DEF) storage unit in accordance with the present disclosure and also showing that the system includes an exhaust pipe mating with an exhaust output port formed in the diesel engine and comprising several conduits, an upstream diesel particulate filter (FILTER), and a downstream Selective Catalytic Reduction (SCR) Converter (CONVERTER), a diesel exhaust fluid supply coupled to a fluid-dispensing pump nozzle by a hose and used to supply diesel exhaust fluid to a DEF tank included in the DEF storage unit, and a DEF transfer system configured to provide means for injecting a metered flow of diesel exhaust fluid discharged from the DEF tank into a mixing zone provided in one of the exhaust pipe conduits included in the exhaust pipe and located downstream of the filter and upstream of the CONVERTER.

A diesel exhaust fluid (DEF) storage unit 10 in accordance with the present disclosure is used to supply a metered amount of diesel exhaust fluid 12 to a mixing zone 14 in an exhaust pipe 16 coupled to a diesel engine 18 as suggested diagrammatically in FIG. 1. In mixing zone 14, diesel exhaust fluid 12 mixes with an exhaust product (i.e., $NO_X$) 20 flowing through exhaust pipe 16 away from diesel engine 18 to produce a mixture 22 that reacts with a suitable catalyst 24 provided in a downstream Selective Catalytic Reduction (SCR) converter 26 to cause water and nitrogen to be discharged from a downstream end 28 of exhaust pipe 16 so as to minimize $NO_X$ emissions downstream from diesel engine 18.

Diesel exhaust fluid 12 is a mixture of ionized water and urea. Diesel exhaust fluid 12 is discharged as a liquid into mixing zone 14 formed in exhaust pipe 16 to mix with filtered exhaust product 21 to produce a $NO_X$/DEF mixture 22 that is admitted into a downstream SCR converter 26 as suggested in FIG. 1. Liquid urea in diesel exhaust fluid 12 crystallizes when exposed to a sufficient amount of air so DEF storage unit 10 is a substantially sealed system designed in accordance with the present disclosure to store and maintain diesel exhaust fluid 12 in a liquid state until it is discharged from DEF tank 30 and delivered in metered amounts to mixing zone 14 in exhaust pipe 16.

DEF storage unit 10 includes a diesel exhaust fluid (DEF) tank 30 and a DEF tank venting control unit 40 formed to include a fill-limit valve module 41, a vapor-transfer module 42, and a breather-valve module 43 as shown illustratively in FIG. 4. DEF tank venting control unit 40 is mounted in a single unit-mount aperture 35 formed in DEF tank 30 as suggested in FIGS. 2 and 4. A low-flow DEF tank venting control unit 40 in accordance with a first embodiment of the present disclosure comprises a breather-valve module 43 including a low-flow membrane 431MLF as shown in FIG. 6A. Alternatively, a high-flow DEF tank venting control unit 40' in accordance with a second embodiment of the present disclosure comprises a breather-valve module 43' including a high-flow membrane 432MHF as shown in FIG. 6B.

Figure 2:
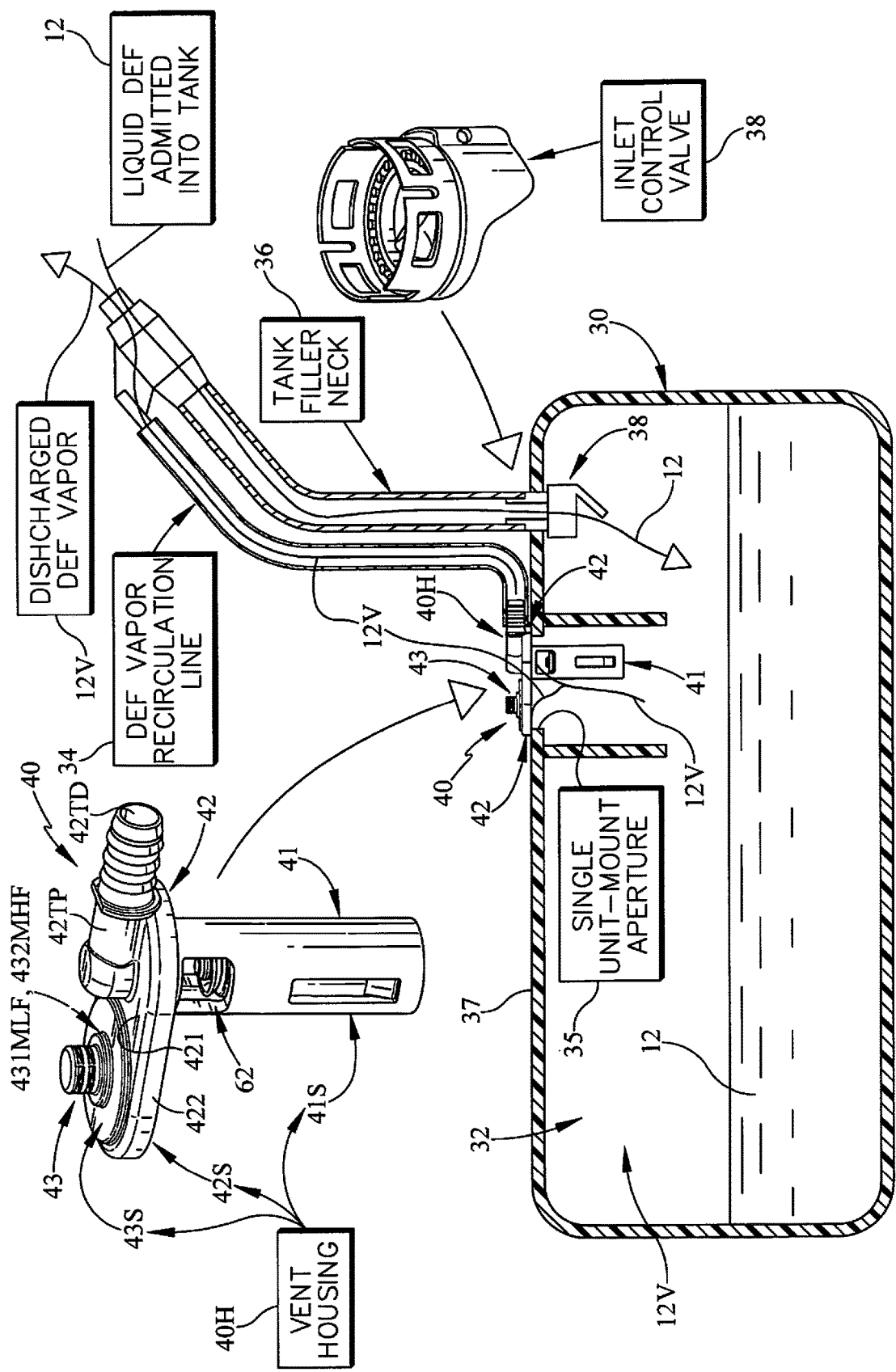
FIG. 2 is a diagrammatic view of an illustrative diesel exhaust fluid (DEF) storage unit comprising a DEF tank, a tank filler neck for the DEF tank, and a DEF tank venting control unit mounted in a single unit-mount aperture formed in a top wall of the DEF tank and suggesting that an illustrative multivent valve of the type shown in perspective in FIG. 2 can serve as the DEF tank venting control unit during admission of liquid DEF into the DEF tank through the tank filler neck to regulate discharge of DEF vapor through a DEF vapor recirculation line and showing that an inlet control valve is coupled to the tank filler neck to lie in an interior region of the DEF tank and configured to allow fluid entry into the DEF tank and block discharge of fluid out of the DEF tank via the tank filler neck.

Fill-limit valve module 41 is located substantially inside DEF tank 30 as suggested in FIGS. 2 and 4. Fill-limit value module 41 provides means for controlling flow of fluid vapor 12V (e.g. ammonia gas) associated with diesel exhaust fluid 12 from an interior region 32 formed in DEF tank 30 to a DEF vapor recirculation line 34 coupled in fluid communication to vapor-transfer module 42 and a tank filler neck 36 coupled to DEF tank 30 to control shutoff of a fluid-dispensing pump nozzle 54 included in a diesel exhaust fluid (DEF) delivery system 50 during a tank-refilling activity after DEF tank 30 is full.

An inlet check valve 38 is provided as suggested in FIG. 2 to regulate flow of fluid between tank filler neck 36 and interior region 32 of tank 30. Inlet check valve 38 comprises a one-way check valve to allow liquid to flow through tank filler neck 36 into tank 30 but to block discharge of liquid from tank 30 into tank filler neck 36.

Breather-valve module 43 is located substantially outside DEF tank 30 in an illustrative embodiment as suggested in FIGS. 2 and 4. Breather-valve module 43 includes a shell 43S and either a semi-permeable membrane 431MLF or 432MHF that is mounted in shell 43S and configured to provide breathing means for regulating flow of air from atmosphere 11 into interior region 32 of DEF tank 30 through vapor-transfer and fill-limit valve modules 42, 41 to maintain a selected positive vapor pressure in interior region 32 without exposing diesel exhaust fluid 12 to enough air to change from a normal liquid state to an unwanted crystalline state and also for regulating discharge of DEF vapor 12V from interior region 32 of DEF tank 30 to atmosphere 11 through fill-limit valve and vapor-transfer modules 41, 42 to block development of a vapor pressure in interior region 32 in excess of a selected maximum pressure.

Vapor-transfer module 42 is interposed between and coupled in fluid communication to each of fill-limit valve and breather-valve modules 41, 43 in an illustrative embodiment as suggested illustratively in FIG. 4. Vapor-transfer module 42 comprises a shell 42S and a vapor-discharge tube 42T and portions of shell 42S and vapor-discharge tube 42T are interposed between fill-limit valve module 41 and breather-valve module 43 as shown in FIG. 4. And each of interior chamber 42C of shell 42S and a fluid-conducting channel 42TC formed in vapor-transfer module 42 is coupled in fluid communication to each of the fill-limit valve module 41 and the breather-valve module 43 as shown in FIG. 4. During a ventilation operation shown (in solid) in FIG. 4, DEF vapor 12V can flow from interior region 38 of DEF tank and interior chamber 42C of shell 42S through breather-valve module 43 to the atmosphere 11. During a refilling operation suggested (in phantom) in FIG. 4, DEF vapor 12V extant in interior region 32 of DEF tank 30 and interior chamber 42C of shell 42S of vapor-transfer module 42 can flow through fill-limit valve module 41 and vapor-conducting channel 42TC of vapor-discharge tube 42T of vapor-transfer module 42 to DEF vapor recirculation line 34.

DEF tank venting control unit 40 is arranged to extend into interior region 32 of DEF tank 30 through a single unit-mount aperture 35 formed in a top wall 37 of DEF tank 30 as suggested in FIGS. 2 and 4. Fill-limit valve module 41 of DEF tank venting control unit 40 is located substantially in interior region 32 of DEF tank 30 and is exposed to diesel exhaust fluid 12 and fluid vapor 12V extant in interior region 32 as suggested in FIG. 2. Breather-valve module 43 of unit 40 is located outside of interior region 32 in an illustrative embodiment and is formed to include an interior chamber 43C in fluid communication with atmosphere 11 as suggested in FIG. 4.

Each of the breather-valve, vapor-transfer, and fill-limit modules 43, 42, and 41 include a hollow shell (e.g. shell 43S, 42S, and 41S) made of a plastics material as suggested in FIGS. 2 and 4. The three shells 41S, 42S, and 43S cooperate to form a unitary vent housing 40H that is associated with the single unit-mount aperture 35 formed in top wall 37 of DEF tank 30 as suggested in FIGS. 2-4. Vent housing 40H provides a compact size and minimized height above top wall 37 of DEF tank 30 in accordance with the present disclosure to allow more space in interior region 32 of DEF tank 30 for tank volume and to fit in a single unit-mount aperture 35 formed in top wall 37 of DEF tank 30.

Breather-valve module 43 includes either a semi-permeable membrane 431MLF or a semi-permeable membrane 432MHF that is mounted in shell 43S of breather-valve module 43 to communicate fluidly with an interior chamber 42C formed in vapor-transfer module 42 and interior chamber 43C formed in shell 43S of breather-valve module 43. Each semi-permeable membrane 431MLF and 432MHF is configured to (1) block flow of liquid fluid 12 from chamber 42C into a fluid-transfer tube 43T included in breather-valve module 43, (2) allow some fluid vapor 12V to pass from chamber 42C to atmosphere 11 through interior chamber 43C as long as a positive pressure is maintained in interior region 32 of DEF tank 30, and (3) allow some air to pass from atmosphere 11 into interior region 32 of DEF tank 30 in sequence through interior chamber 43C, interior chamber 42C, and the fill-limit valve module 41 to dissipate any unwanted negative pressure (i.e., vacuum) that might develop in interior region 32 of DEF tank 30 owing to exposure of DEF tank 30 to various external environmental conditions such as, for example, cool evening temperatures and without causing crystallization of the liquid diesel exhaust fluid 12 stored in DEF tank 30.

Fill-limit valve module 41 includes a body 60 and a fill-limit vent valve 62. Fill-limit valve 62 comprises a float 64 and a closure 66 coupled to an upper portion of float 64 and arranged to move up and down on liquid diesel exhaust fluid 12 admitted from interior region 32 of DEF tank 30 into a float chamber 68 formed in body 60 to receive float 64 therein as suggested in FIG. 4. Body 60 comprises a valve-receiver tube 60T and suitable valve-support means 60V for retaining fill-limit vent valve 62 inside tube 60T after valve 62 has been installed in float chamber 68 in vent housing 40H. Valve-support means 60V is located inside front chamber 68 and is coupled to valve-receiver tube 60T as shown, for example, in FIG. 5.

When installed in a membrane receiver 43R formed in breather-valve module 43, each of semi-permeable membranes 431MLF and 432MHF have an underside in fluid communication with fluid vapor 12V extant in interior chamber 42C of vapor-transfer module 42 and a topside in fluid communication with atmospheric air 11 extant in interior chamber 43C of breather-valve module 43 as suggested in FIGS. 4-8. Membrane 431MLF is configured to provide a relatively low-flow membrane of a relatively small size as suggested in FIG. 7. In contrast, membrane 432MHF is configured to provide a relatively high-flow membrane of a relatively larger size as suggested in FIG. 8. These membranes 431MLF and 432MHF are configured to be mounted in a membrane receiver 43R formed in breather-valve module 43 and are interchangeable as suggested in FIGS. 6-8 to change flow rate of DEF vapor 12V discharged from DEF tank 30 via breather valve module 43. In illustrative embodiments, each membrane is a one layer PTFE membrane.

Membrane receiver 43R of breather-valve module 43 lies under a fluid-transfer tube 43T included in shell 43S of breather-valve module 43 as suggested in FIG. 4. Membrane receiver 43R comprises a large membrane-receiving cavity 43RL that is sized to receive the relatively larger high-flow membrane 432MHF therein and open downwardly toward interior chamber 42C of vapor-transfer module 42 and interior region 32 of DEF tank 30 as suggested in FIGS. 2, 6, and 8. Membrane receiver 43R also comprises a relatively smaller membrane-receiving cavity 43RS that is sized to receive the relatively smaller low-flow membrane 431MLF therein and open downwardly toward interior chamber 42C of vapor-transfer module 42 and interior region 32 of DEF tank 30 as suggested in FIGS. 2 and 6. Small cavity 43RS is located between fluid-transfer tube 43T and large cavity 43RL as suggested in FIG. 6.

Each membrane 431MLF and 432MHF is a filter medium which allows air to go through but blocks liquid flow in both directions. The size of the membrane 431MLF, 432MHF defines the ventilation area and directly affects how much air can flow through the membrane in time to determine, for example, how quickly over-pressure conditions or vacuum conditions in the tank can be relieve by discharge of pressurized fluid vapor 12V from DEF tank 30 or admission of outside air into DEF tank 30.

The selection of which membrane 431MLF or 432MHF to use depends on the SCR system design. For example, larger membrane 432MHF will often be used in versions of an SCR system where there is little risk of tank overfilling and the large membrane is used only for tank ventilation. In contrast, small membrane 431MLF could be used in an SCR system where there might be a risk of tank overfilling.

If the tank ventilation flow is too great, then there is a risk that the DEF tank 30 could be overfilled (for example, during repeated refilling), because the pressure in DEF tank 30 which builds up at the end of the refilling would be ventilated too quickly allowing more and more liquid DEF fluid 12 to be added to DEF tank 30. Such liquid DEF fluid 12 could fill interior region 32 of DEF tank 30. That condition is to be avoided since DEF fluid freeze in an overfilled DEF tank 30 during winter could lead to ice expansion and damage to DEF tank 30. This is one reason why the kit in accordance with the present disclosure provides a small low-flow membrane 431MLF option so as to provide limited ventilation flow which is sufficient to compensate for small pressure changes-especially during vacuum conditions created in DEF tank 30 by tank pump 112. In an SCR system in which membrane 431MLF is used in accordance with the present disclosure, another vent membrane (not shown) would be provided in an SCR cap to allow for high ventilation flow which does not affect the tank refilling as long as that vent membrane is included in a cap that is demounted during tank refilling.

An illustrative exhaust after-treatment system 100 is shown diagrammatically in FIG. 1. System 100 is associated with diesel engine 18 and comprises DEF storage unit 10 and a DEF transfer system 110 coupled to DEF storage unit 10 and to an exhaust pipe 16 that is coupled to a diesel engine 18.

Exhaust pipe 16 is configured to mate with and receive exhaust product 22 discharged from diesel engine 18 through an exhaust output port 18P formed in diesel engine 18 as suggested in FIG. 1. Exhaust pipe 16 comprises, in series, an upstream conduit 161, a diesel particulate filter 25, a midstream conduit 162, a selective catalytic reduction (SCR) converter 26, and a downstream conduit 163 as suggested in FIG. 1. Exhaust product 20 discharged from diesel engine 18 and flowing through upstream exhaust conduit 161 comprises nitrogen oxides ($NO_x$) and particulate matter (PM). The particulate matter is trapped in diesel particulate trap 25 to cause filtered exhaust product 21 to flow away from diesel particulate trap 25 through midstream conduit 162. Owing to operation of converter 26 and metered discharge of diesel exhaust fluid 12 into mixing zone 14 in midstream conduit 162, diesel exhaust fluid 12 mixes with filter exhaust product 21 in mixing zone 14 to produce a $NO_x$/DEF mixture 22 that is then converted in SCR converter 26 to water and nitrogen for discharge from exhaust pipe 16 through downstream conduit 163 as suggested in FIG. 1.

A diesel exhaust fluid (DEF) transfer system (means) 110 is provided for injecting a metered flow of diesel exhaust fluid 12 discharged from DEF tank 30 into the mixing zone 14 formed in midstream conduit 162 of filler neck 16 as suggested in FIG. 1. In illustrative embodiments, DEF transfer system 110 comprises, in series, a discharge conduit 111, a fluid pump 112, a fluid meter 113, and a fluid-discharge nozzle 114 coupled in fluid communication to mixing zone 14 as suggested in FIG. 1. In illustrative embodiments, the diesel exhaust fluid 12 discharged into mixing zone 14 hydrolyzes into ammonia gas ($NH_3$) which mixes with flowing filtered exhaust product 21 to produce a mixture 22 that flows into SCR converter 26. Ammonia ($NH_3$) and Nitrogen Oxides ($NO_x$) react with the catalyst 24 provide in SCR converter 26 to form nitrogen and water.

During tank refilling activity (before shutoff), fluid-dispensing pump nozzle 54 is on and dispenses liquid diesel exhaust fluid 12 into interior region 32 of DEF tank 30 via tank filler neck 36. Fluid level rises in interior region 32 to displace air and fuel vapor exhaust in interior region 32. Fuel vapor 12V exits interior region 32 through first and second vent apertures 60T1, 60T2 formed in valve-receiver tube 60T of body 60 of fill-limit valve module 41 and flows through float chamber 68 to DEF vapor recirculation line 34 and tank filler neck 36 as suggested in FIG. 4.

At shutoff, float 64 has risen in float chamber 68 formed in tube 60T to cause closure 66 to close the aperture opening into interior chamber 42C formed in vapor-transfer module 42. This closure increases pressure in interior region 32 of DEF tank 30 and provides shutoff for DEF delivery system 50 in a normal way.

A breathing operation begins in breather-valve module 43 (after shutoff) using semi-permeable membrane 431MLF or 432MHF. Semi-permeable membrane 431MLF or 432MHF restricts discharge of fluid vapor 12V and liquid diesel exhaust fluid 12 to atmosphere 11 through interior chamber 43C but allows DEF tank 30 to breath to admit atmospheric air into interior region 32 of DEF tank 30 as needed so as to minimize unwanted high-pressure and negative-pressure conditions that might otherwise develop in DEF tank 30 under certain operating conditions. Air and fluid vapor 12V are able to flow between atmosphere 11 and interior region 32 of DEF tank 30 in accordance with predetermined flow criteria established by design of the semi-permeable membrane 431MLF (low-flow) or 432MLF (high-flow) via the interior chamber 42C of vapor-transfer module 42 during normal operating conditions of system 100.

DEF tank venting control valve 40 is configured to manage operation venting of DEF tank 30 to provide compensation of vacuum created by the delivery pump 112 and compensation of over/under pressure created by environmental changes (e.g. temperature, atmospheric pressure, etc.). DEF tank venting control valve 40 is also configured to manage refilling ventilation to provide ventilation of DEF tank 30 during refilling and stop ventilation after fluid 12 in DEF tank reaches a defined fill level.

An exhaust after-treatment system 100 adapted to supply a metered amount of diesel exhaust fluid 12 to a mixing zone 14 in an exhaust pipe 26 is coupled to a diesel engine 18 as suggested in FIG. 1. System 100 comprises a diesel exhaust fluid tank venting control unit 40 shown diagrammatically in FIG. 1. As suggested in FIG. 4, tank venting control unit 40 includes a fill-limit valve module 41 adapted to receive diesel exhaust fluid 12 from a diesel exhaust fluid tank 30, a breather-valve module 43 exposed to the atmosphere 11, and a vapor-transfer module 42 interposed between and coupled in fluid communication to each of fill-limit valve module 41 and breather-valve module 43.

Figure 4A:
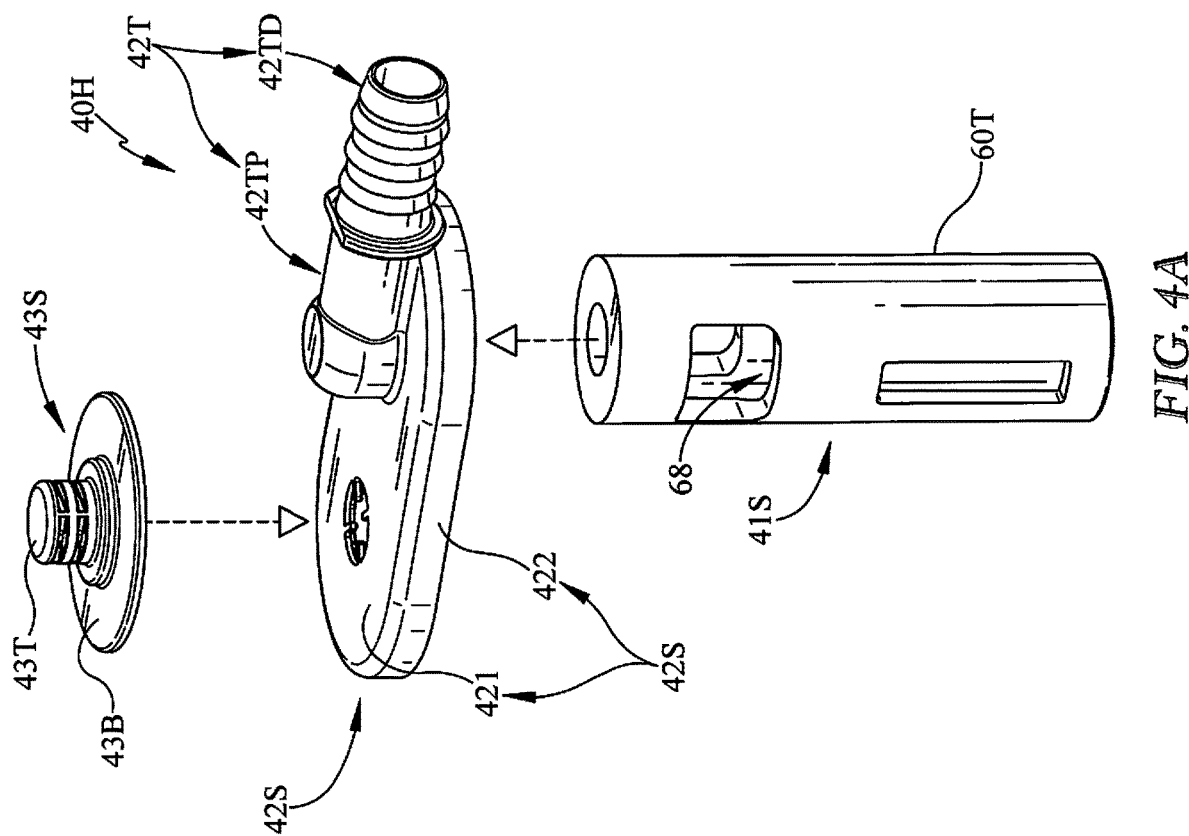
FIG. 4A is an enlarged perspective view of the unitary vent housing included in the DEF tank venting control unit shown in FIGS. 2-4 and showing separation of the hollow shells that are included in the breather-valve, vapor-transfer, and fill-limit valve modules and that cooperate to form the unitary vent housing when mated as shown in FIGS. 2-4.
Figure 5:
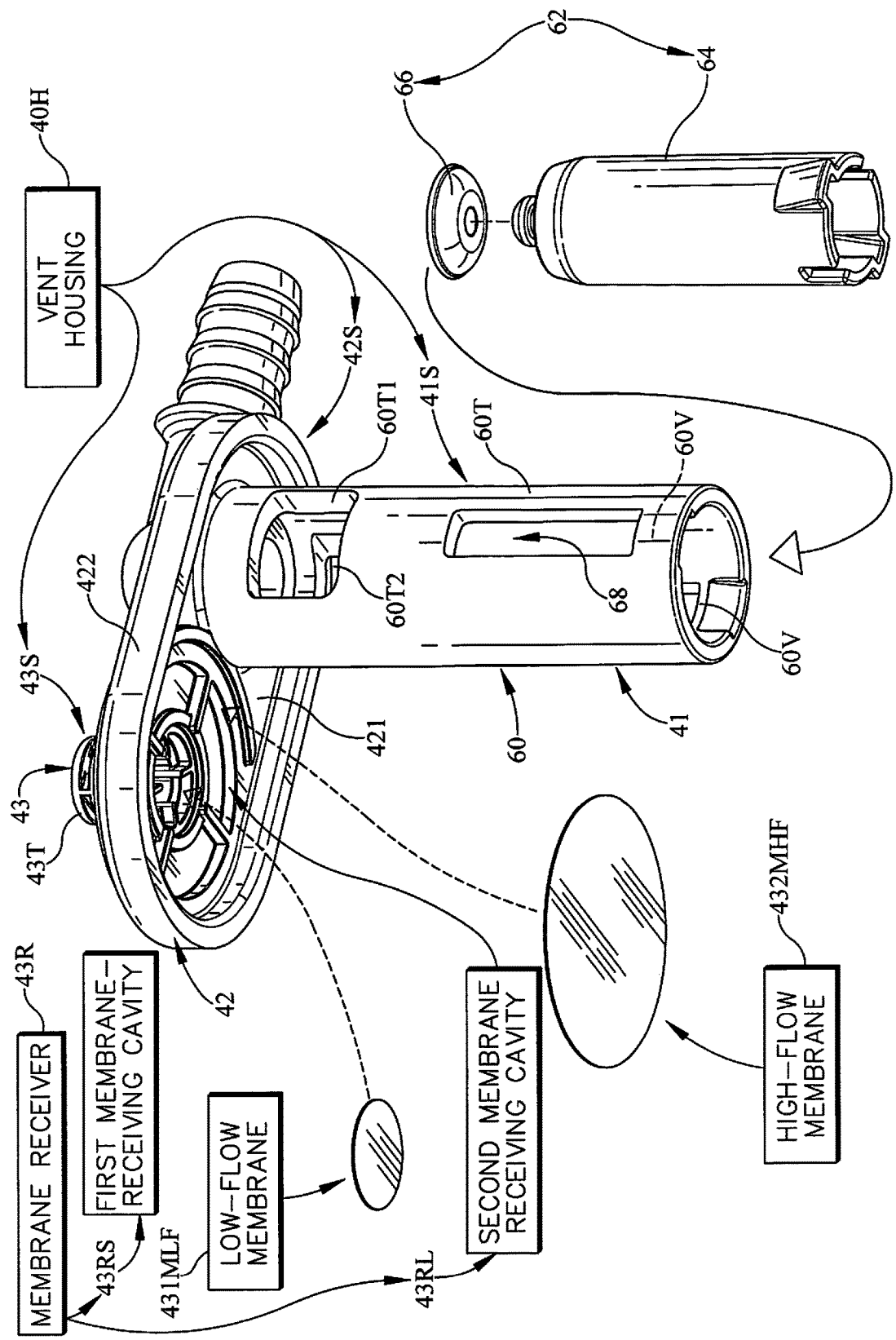
FIG. 5 is an exploded perspective assembly view of several pieces that cooperate to provide a tank venting kit and which can be combined in one way to produce a low-flow DEF tank venting control unit to be mounted in a DEF tank as shown in FIG. 6A and in another way to produce a high-flow DEF tank venting control unit to be mounted in a DEF tank as shown in FIG. 6B and showing a low-flow membrane that can be mounted in a first membrane-receiving cavity of the membrane receiver formed in the breather-valve module and also showing a relatively larger high-flow membrane to be mounted in a concentric second membrane-receiving cavity of the membrane receiver formed in the breather-valve module as an alternative to the low-flow membrane.

Breather-valve module 43 includes an interior chamber 43C and a semi-permeable membrane 431MLF or 432MHF as suggested in FIGS. 4 and 5. One of those membranes will be selected and mounted in interior chamber 43C as suggested in FIGS. 6A and 6B so that it has a topside exposed to atmospheric air 11 admitted into the interior chamber and an underside exposed to fluid vapor 12V associated with diesel exhaust fluid 12 in the diesel exhaust fluid tank 30 and fluid vapor 12V conducted through vapor-transfer module 42 as suggested.

Breather-valve module 43 is formed to include a membrane receiver 43R that comprises a lower portion of interior chamber 43C as suggested in FIG. 4. Membrane receiver 43R is arranged to open downwardly toward an interior chamber 42C formed in vapor-transfer module 42 as suggested in FIG. 4. Membrane receiver 43R is and adapted to communicate with an interior region 32 of diesel exhaust fluid tank 30 via the interior chamber 42C of vapor-transfer module 42 when the diesel exhaust tank venting control unit 40 is mounted in an aperture 35 formed in a top wall 37 of diesel exhaust fluid tank 30 and one of the semi-permeable membranes 431MLF or 432MHF is mounted in membrane receiver 43R.

Membrane receiver 43R comprises a small membrane-receiving cavity 43RS arranged to lie in spaced-apart relation to the interior chamber 42C of vapor-transfer module 42 and a relatively larger membrane-receiving cavity 43RL arranged to lie between the small membrane-receiving cavity 43RS and the interior chamber 42C of vapor-transfer module 42 as suggested in FIG. 4. The selected membrane 431MLF or 432MHF is mounted in only one of the small and relatively larger membrane-receiving cavities 43RS, 43RL as suggested in FIGS. 6A and 6B.

The selected membrane is one of a low-flow membrane 431MLF sized to fit in the small membrane-receiving cavity 43RS as suggested in FIG. 6A and a relatively larger high-flow membrane 432MHF sized to fit in the relatively larger membrane-receiving cavity 43RL as suggested in FIG. 6B. These membranes are selected from a kit comprising the low-flow and high-flow membranes 431MLF, 432MHF as suggested in FIG. 5. By providing a kit in accordance with the present disclosure, it is easy to change OPERATION VENTING flow associated with breather-valve module 43 simply by exchanging one membrane for another as described herein. Low-flow membrane 431MLF is a round disk having a first diameter and the relatively larger high-flow membrane 432MHF is a round disk having a second diameter that is greater than the first diameter as shown, for example, in FIG. 5.

Diesel exhaust fluid tank 30 has a top wall 37 formed to include a unit-mount aperture 35 as shown, for example, in FIGS. 1 and 4. Vapor-transfer module 42 includes a shell 42S comprising a plate 421 and a downwardly extending endless rim 422 coupled to a perimeter edge of plate 421 as shown in FIG. 4A. Rim 422 of shell 42S is arranged to mate with an upwardly facing portion of top wall 37 of diesel exhaust fluid tank 30 bordering unit-mount aperture 35 as shown in FIG. 4 to locate plate 421 above unit-mount aperture 35 and place interior chamber 42C of vapor-transfer module 42 bounded by plate 421 and the downwardly extending endless rim 422 in communication with an interior region 32 formed in diesel exhaust fluid tank 30 via unit-mount aperture 35 formed in top wall 37 of diesel exhaust fluid tank 30.

Breather-valve module 43 includes an upright shell 43S coupled to a topside of plate 421 as suggested in FIGS. 2 and 4A. Upright shell 43S is arranged to extend upwardly away from interior region 32 of diesel exhaust fluid tank 30 as shown, for example, in FIG. 4. Fill-limit valve module 41 includes a pendant shell 41S coupled to an underside of plate 421 as suggested in FIGS. 4A and 5. Pendant shell 41S is arranged to extend downwardly into interior region 32 of diesel exhaust fluid tank 30 as suggested in FIG. 4.

Vapor-transfer module 42 further includes a vapor-discharge tube 42T adapted to be coupled to a DEF vapor recirculation line 34 and coupled to the topside of plate 421 to align with a fill-limit vapor-discharge aperture 421A formed in plate 421 as suggested in FIG. 4. Vapor-discharge tube 42T is coupled to the topside of plate 421 as shown in FIG. 4 to receive pressurized fluid vapor 12V discharged from interior region 32 of diesel exhaust fluid tank 30 via the float chamber 68 formed in valve-receiver tube 60T and the fill-limit vapor discharge aperture 421A formed in plate 421.

Vapor-discharge tube 42T is formed to include a vapor-conducting channel 42TC that is arranged to receive fluid vapor 12V discharged from interior region 32 of diesel exhaust fluid tank 30 through fill-limit valve module 41 and to conduct such fluid vapor 12V to a DEF vapor recirculation line 34 associated with an output end 42TD of vapor-discharge tube 42T. Vapor-discharge tube 42T includes an elongated proximal portion 42TP that is arranged to overlie plate 421 and a portion of endless rim 422 and a distal portion 42TD that is arranged to extend away from rim 422 to locate proximal portion 42TP between breather-valve module 43 and distal portion 42TD as suggested in FIGS. 2 and 4A.

Breather-valve module 43 includes a vertically extending fluid-transfer tube 43T and a tube-support base 43B as shown, for example, in FIGS. 4 and 4A. Tube-support base 43B is coupled to fluid-transfer tube 43T cooperatively to form the interior chamber 43C of breather-valve module 43 as shown I FIG. 4 and coupled to plate 421 to locate fluid-transfer tube 43T above plate 421 as shown in FIG. 3. Vapor-discharge tube 42T is arranged to extend horizontally in a direction away from the vertically extending fluid-transfer tube 43T as shown, for example, in FIG. 4.

Fill-limit valve module 41 includes a valve-receiver tube 60T having a lower end located in interior region 32 of diesel exhaust fluid tank 30 and an upper end coupled to the underside of plate 421 and surrounded by endless rim 422 as shown, for example, in FIG. 4. Valve-receiver tube 60T is formed to include a float chamber 68 exposed to DEF vapor 12V extant in interior region 32 of diesel exhaust fluid tank 30 and arranged to open into fill-limit vapor discharge aperture 421A formed in plate 421 as shown, for example, in FIG. 4 Valve-receiver tube 60T is located in laterally spaced-apart relation to the breather-valve module 43 that is coupled to plate 421.

Fluid-transfer tube 43T of breather valve module 43 is formed to include a fluid-conducting channel that provides a first portion of interior chamber 43C as suggested in FIG. 4. Tube-support base 43B is formed to provide a membrane receiver 43R that provides a second portion of interior chamber 32 to cause membrane receiver 43R to lie in fluid communication with the fluid-conducting channel as also suggested in FIG. 4. The selected semi-permeable membrane 431MLF or 432MHF is arranged to lie in membrane receiver 43R to regulate fluid flow between the fluid-conducting channel of fluid transfer tube 43T and vapor-transfer module 42 as suggested in FIG. 5 and shown in FIGS. 6A and 6B.

Tube-support base 43B of breather-valve module 43 is formed to cause membrane receiver 43R to open downwardly toward an interior chamber 42C formed in vapor-transfer module 42 as suggested in FIG. 5. Membrane receiver 43R is adapted to communicate with interior region 32 of the diesel exhaust fluid tank 30 via interior chamber 42C of vapor-transfer module 42.

The invention claimed is:

1. An exhaust after-treatment system adapted to supply a metered amount of diesel exhaust fluid to a mixing zone in an exhaust pipe coupled to a diesel engine, the system comprising a diesel exhaust fluid tank venting control unit including
a fill-limit valve module adapted to receive diesel exhaust fluid from a diesel exhaust fluid tank, a breather-valve module exposed to the atmosphere, and a vapor-transfer module interposed between and coupled in fluid communication to each of the fill-limit valve module and the breather-valve module, wherein the breather-valve module includes an interior chamber and a semi-permeable membrane having a topside exposed to atmospheric air admitted into the interior chamber and an underside exposed to fluid vapor associated with diesel exhaust fluid in the diesel exhaust fluid tank and fluid vapor conducted through the vapor-transfer module, wherein the breather-valve module is formed to include a membrane receiver that is arranged to open downwardly toward an interior chamber formed in the vapor-transfer module and adapted to communicate with an interior region of the diesel exhaust fluid tank via the interior chamber of the vapor-transfer module when the diesel exhaust tank venting control unit is mounted in an aperture formed in a wall of the diesel exhaust fluid tank and the semi-permeable membrane is mounted in the membrane receiver, and wherein the membrane receiver comprises a small membrane-receiving cavity arranged to lie in spaced-apart relation to the interior chamber of the vapor-transfer module and a large membrane-receiving cavity that is relatively larger than the small membrane-receiving cavity, the large membrane-receiving cavity arranged to lie between the small membrane-receiving cavity and the interior chamber of the vapor-transfer module and the membrane is mounted in only one of the small and large membrane-receiving cavities.

2. The system of claim 1, wherein the membrane is one of a low-flow membrane sized to fit in the small membrane-receiving cavity and a high low high-flow membrane that is configured to regulate flow of air from atmosphere into the interior region, the high-flow membrane sized to fit in the large membrane-receiving cavity selected from a kit comprising the low-flow and high-flow membranes.

3. The system of claim 2, wherein the low-flow membrane is a round disk having a first diameter and the high-flow membrane is a round disk having a second diameter that is greater than the first diameter.

4. An exhaust after-treatment system adapted to supply a metered amount of diesel exhaust fluid to a mixing zone in an exhaust pipe coupled to a diesel engine, the system comprising a diesel exhaust fluid tank venting control unit including a fill-limit valve module adapted to receive diesel exhaust fluid from a diesel exhaust fluid tank, a breather-valve module exposed to the atmosphere, and a vapor-transfer module interposed between and coupled in fluid communication to each of the fill-limit valve module and the breather-valve module, wherein the breather-valve module includes an interior chamber and a semi-permeable membrane having a topside exposed to atmospheric air admitted into the interior chamber and an underside exposed to fluid vapor associated with diesel exhaust fluid in the diesel exhaust fluid tank and fluid vapor conducted through the vapor-transfer module, and the diesel exhaust fluid tank having a top wall formed to include a unit-mount aperture, and wherein the vapor-transfer module includes a shell comprising a plate and a downwardly extending endless rim coupled to a perimeter edge of the plate and arranged to mate with an upwardly facing portion of the top wall of the diesel exhaust fluid tank bordering the unit-mount aperture to locate the plate above the unit-mount aperture and place an interior chamber of the vapor-transfer module bounded by the plate and the downwardly extending endless rim in communication with an interior region formed in the diesel exhaust fluid tank via the unit-mount aperture formed in the top wall of the diesel exhaust fluid tank.

5. The system of claim 4, wherein the breather-valve module includes an upright shell coupled to a topside of the plate and arranged to extend upwardly away from the interior region of the diesel exhaust fluid tank and the fill-limit valve module includes a pendant shell coupled to an underside of the plate and arranged to extend downwardly into the interior region of the diesel exhaust fluid tank.

6. The system of claim 5, wherein the vapor-transfer module further includes a vapor-discharge tube adapted to be coupled to a DEF vapor recirculation line and coupled to the topside of the plate to align with a fill-limit vapor-discharge aperture formed in the plate and the vapor-discharge tube is arranged to receive fluid vapor discharged from the interior region of the diesel exhaust fluid tank through the fill-limit valve module and is adapted to conduct such fluid vapor to a DEF vapor recirculation line associated with an output end of the vapor-discharge tube.

7. The system of claim 6, wherein the vapor-discharge tube includes an elongated proximal portion that is arranged to overlie the plate and a portion of the endless rim and a distal portion that is arranged to extend away from the endless rim to locate the proximal portion between the breather-valve module and the distal portion.

8. The system of claim 6, wherein the breather-valve module includes a vertically extending fluid-transfer tube and a tube-support base coupled to the fluid-transfer tube cooperatively to form the interior chamber of the breather-valve module and coupled to the plate to locate the fluid-transfer tube above the plate and wherein the vapor-discharge tube is arranged to extend horizontally in a direction away from the vertically extending fluid-transfer tube.

9. The system of claim 4, wherein the fill-limit valve module includes a valve-receiver tube having a lower end located in the interior region of the diesel exhaust fluid tank and an upper end coupled to the underside of the plate and surrounded by the endless rim.

10. The system of claim 9, wherein the valve-receiver tube is formed to include a float chamber exposed to DEF vapor extant in the interior region of the diesel exhaust fluid tank and arranged to open into a fill-limit vapor discharge aperture formed in the plate and located in laterally spaced-apart relation to the breather-valve module coupled to the plate.

11. The system of claim 10, wherein the vapor-transfer module further includes a vapor-discharge tube coupled to the topside of the plate to receive pressurized fluid vapor discharged from the interior region of the diesel exhaust fluid tank via a float chamber formed in the valve-receiver tube and the fill-limit vapor discharge aperture formed in the plate.

12. The system of claim 4, wherein the breather-valve module includes a vertically extending fluid-transfer tube and a tube-support base coupled to the fluid-transfer tube cooperatively to form the interior chamber of the breather-valve module, the tube-support base is coupled to the plate of the vapor-transfer module to locate the fluid-transfer tube above the plate, the fluid-transfer tube is formed to include a fluid-conducting channel that provides a first portion of the interior chamber, and the tube-support base is formed to provide a membrane receiver that provides a second portion of the interior chamber to cause the membrane receiver to lie in fluid communication with the fluid-conducting channel, and the semi-permeable membrane is arranged to lie in the membrane receiver to regulate fluid flow between the fluid-conducting channel and the vapor-transfer module.

13. The system of claim 12, wherein the tube-support base of the breather-valve module is formed to cause the membrane receiver to open downwardly toward an interior chamber formed in the vapor-transfer module and adapted to communicate with the interior region of the diesel exhaust fluid tank via the interior chamber of the vapor-transfer module.

14. The system of claim 13, wherein the membrane receiver formed in the tube-support base comprises a small membrane-receiving cavity arranged to lie in spaced-apart relation to the interior chamber of the vapor-transfer module and a large membrane-receiving cavity that is relatively larger than the small membrane-receiving cavity, the large membrane-receiving cavity arranged to lie between the small membrane-receiving cavity and the interior chamber of the vapor-transfer module and the membrane is mounted in only one of the small and large membrane-receiving cavities.

15. The system of claim 14, wherein the membrane is one of a low-flow membrane sized to fit in the small membrane-receiving cavity and a high-flow membrane that is configured to regulate flow of air from atmosphere into the interior region, the high-flow membrane sized to fit in the large membrane-receiving cavity selected from a kit comprising the low-flow and high-flow membranes.

\* \* \* \* \*